US007859570B2

(12) United States Patent
Tsutsui

(10) Patent No.: US 7,859,570 B2
(45) Date of Patent: Dec. 28, 2010

(54) ELECTRONIC APPARATUS

(75) Inventor: Tatsuya Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 11/974,306

(22) Filed: Oct. 12, 2007

(65) Prior Publication Data
US 2008/0088709 A1 Apr. 17, 2008

(30) Foreign Application Priority Data
Oct. 16, 2006 (JP) ............... P2006-281153

(51) Int. Cl.
*H04N 5/232* (2006.01)
(52) U.S. Cl. .................................. 348/211.2
(58) Field of Classification Search ............... 348/211.2
See application file for complete search history.

(56) References Cited

U.S. PATENT DOCUMENTS

| 5,142,985 | A * | 9/1992 | Stearns et al. ............... 102/213 |
| 5,277,113 | A * | 1/1994 | Stearns et al. ............... 102/213 |
| 6,574,482 | B1 * | 6/2003 | Radomsky et al. ........... 455/517 |
| 2002/0030871 | A1 * | 3/2002 | Anderson et al. ........... 359/150 |
| 2003/0160873 | A1 * | 8/2003 | Tecu et al. ............... 348/211.2 |
| 2005/0131494 | A1 * | 6/2005 | Park et al. ..................... 607/60 |

FOREIGN PATENT DOCUMENTS

| JP | 5-107608 | 4/1993 |
| JP | 6-269056 | 9/1994 |
| JP | 9-23190 | 1/1997 |
| JP | 2000 111400 | 4/2000 |
| JP | 2006-180465 | 7/2006 |

* cited by examiner

*Primary Examiner*—James M Hannett
(74) *Attorney, Agent, or Firm*—Frommer Lawrence & Haug LLP; William S. Frommer; Thomas F. Presson

(57) ABSTRACT

An electronic apparatus includes a photodetector element for receiving an infrared signal transmitted from a remote controller and outputting a received signal, a conversion unit for converting the received signal outputted from the photodetector element into a binarized pulse signal and outputting the signal, a decode unit for converting the pulse signal outputted from the conversion unit into code data and outputting the code data, and a control unit for performing a control operation in accordance with the code data. The electronic apparatus further includes a measuring unit for measuring a pulse width of a pulse signal outputted from the conversion unit in a state where the infrared signal from the remote controller is not received at the photodetector element, and a judging unit for judging whether the pulse width measured by the measuring unit is equal to or longer than a predetermined time for determining a stable reception environment.

9 Claims, 8 Drawing Sheets

2S

CLK

2S

2S

ELECTRONIC APPARATUS

BACKGROUND OF THE INVENTION

1. Field of the Invention

The present invention relates to an electronic apparatus operated by using a remote controller using an infrared signal.

2. Description of Related Art

There has been provided an electronic apparatus remotely controlled by a remote controller using an infrared signal.

Meanwhile, if the electronic apparatus of this type is used indoors at the place illuminated by an inverter illumination apparatus driven with a high frequency power source, an infrared ray contained in illumination light radiated from the inverter illumination apparatus may interfere with an infrared signal transmitted from an infrared ray remote controller. As a result, there may be caused a malfunction that the remote controller does not operate normally and the electronic apparatus may not be operated in a way intended by a user. Further, it is also known that an infrared ray contained in light irradiated from an electronic apparatus, such as a display apparatus, in addition to the inverter illumination apparatus of this type may cause the malfunction as described above.

The above malfunction is caused because of loss or modification of an electric signal outputted from a photodetector device which is provided in an electronic apparatus for receiving an infrared signal, when the photodetector device receives an infrared ray from an inverter illumination apparatus, a display apparatus and the like.

Therefore, technology is proposed which provide a plurality of selectively switchable optical filters in front of the photodetector device of an electronic apparatus to enable selection of an optical filter most absorbing an infrared ray irradiated from an inverter illumination apparatus or the like (refer to Japanese Patent Application Publication No. JP 2000-111400).

SUMMARY OF THE INVENTION

However, the above-described related art techniques become effective only after a malfunction is caused in that a remote controller does not operate normally.

It is preferable if it is possible to know in advance whether there is a possibility that such a malfunction occurs in the environment where an electronic apparatus is placed, because some countermeasures may be taken such as change of an illumination apparatus or change of a position of the electronic apparatus.

The present invention is made in view of the above-described circumstance. According to an embodiment of the present invention, there is provided an electronic apparatus effective for detecting readily and reliably whether the electronic apparatus is in an environment where a remote controller may be operated stably.

According to one embodiment of the present invention, there is provided an electronic apparatus including a photodetector element for receiving an infrared signal transmitted from a remote controller and outputting a signal for received light, a conversion unit for converting the signal for received light outputted from the photodetector element into a binary pulse signal to output the pulse signal, a decode unit for converting the pulse signal outputted from the conversion unit into code data for outputting the code data, and a control unit for performing a control operation in accordance with the code data. Further, the electronic apparatus includes a measuring unit for measuring a pulse width of a pulse signal outputted from the conversion unit in a state where the infrared signal from the remote controller is not received at the photodetector element; and a judging unit for judging whether the pulse width measured by the measuring unit is equal to or longer than a predetermined time or not.

DESCRIPTION OF THE PREFERRED EMBODIMENT

Next, an embodiment of the present invention will be described with reference to the accompanying drawings.

Figure 1:
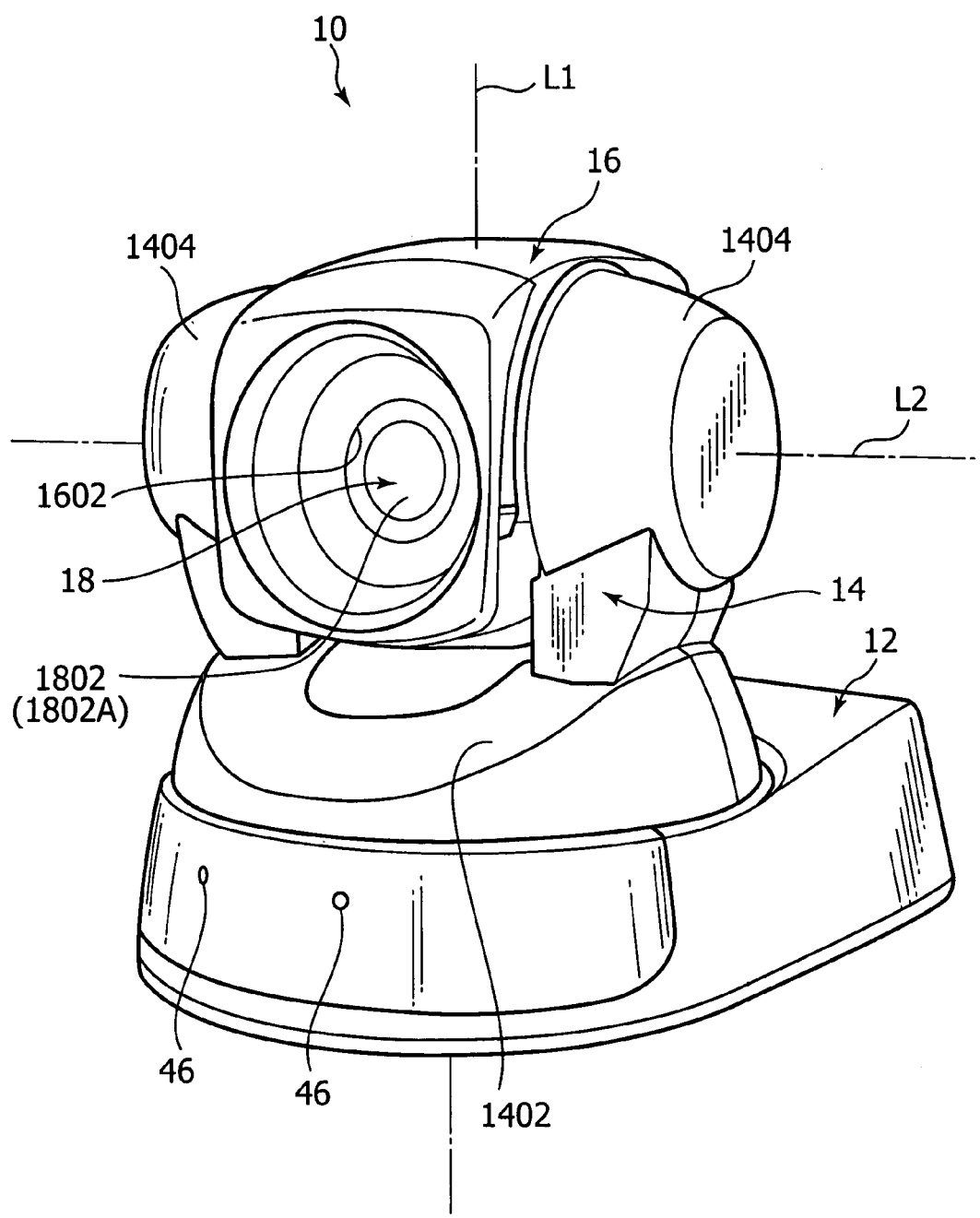
FIG. 1 is a perspective view of an imaging apparatus 10 viewed from front according to an embodiment of the present invention.
Figure 2:
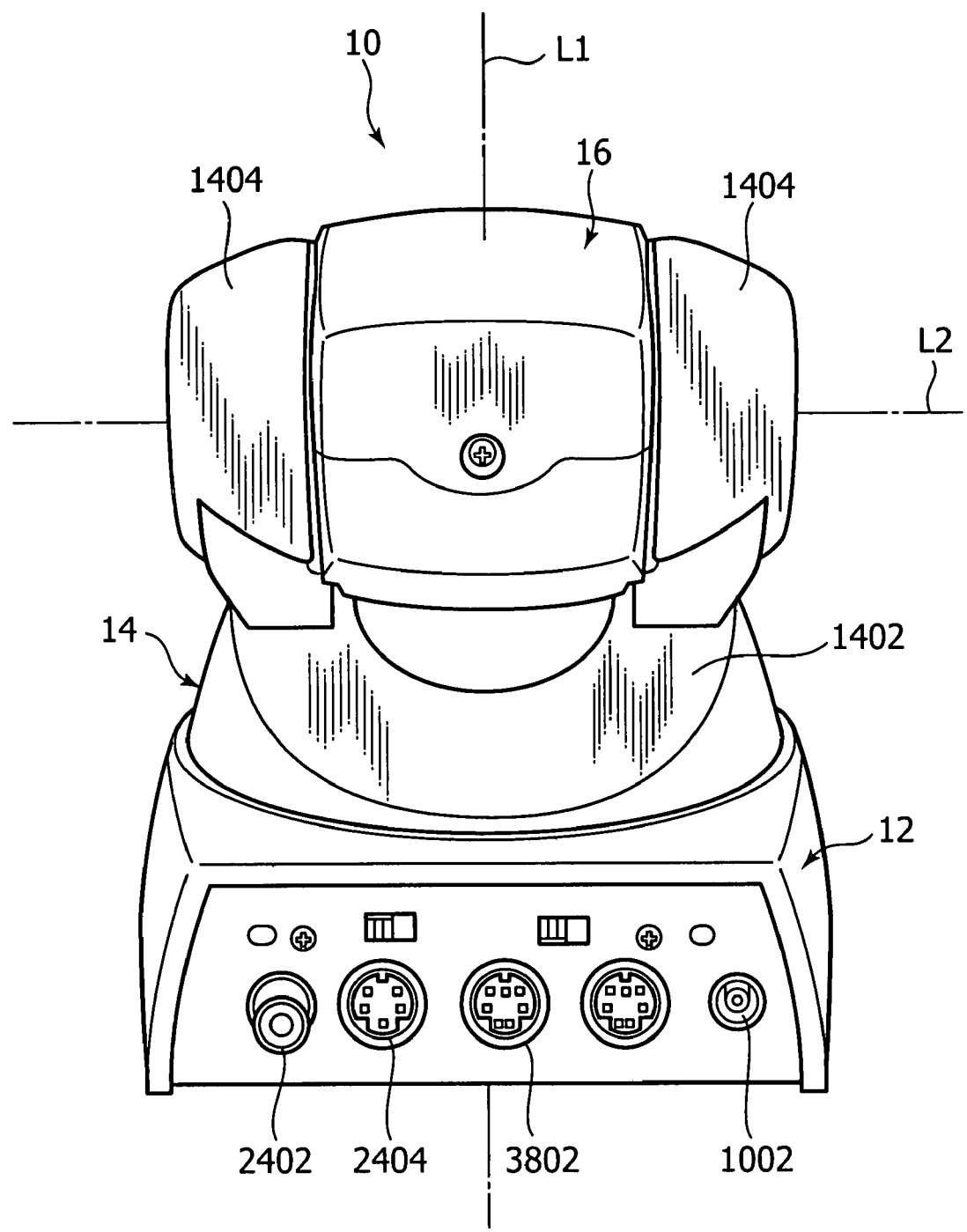
FIG. 2 is a perspective view of the imaging apparatus 10 viewed from backward according to the embodiment of the present invention.
Figure 3:
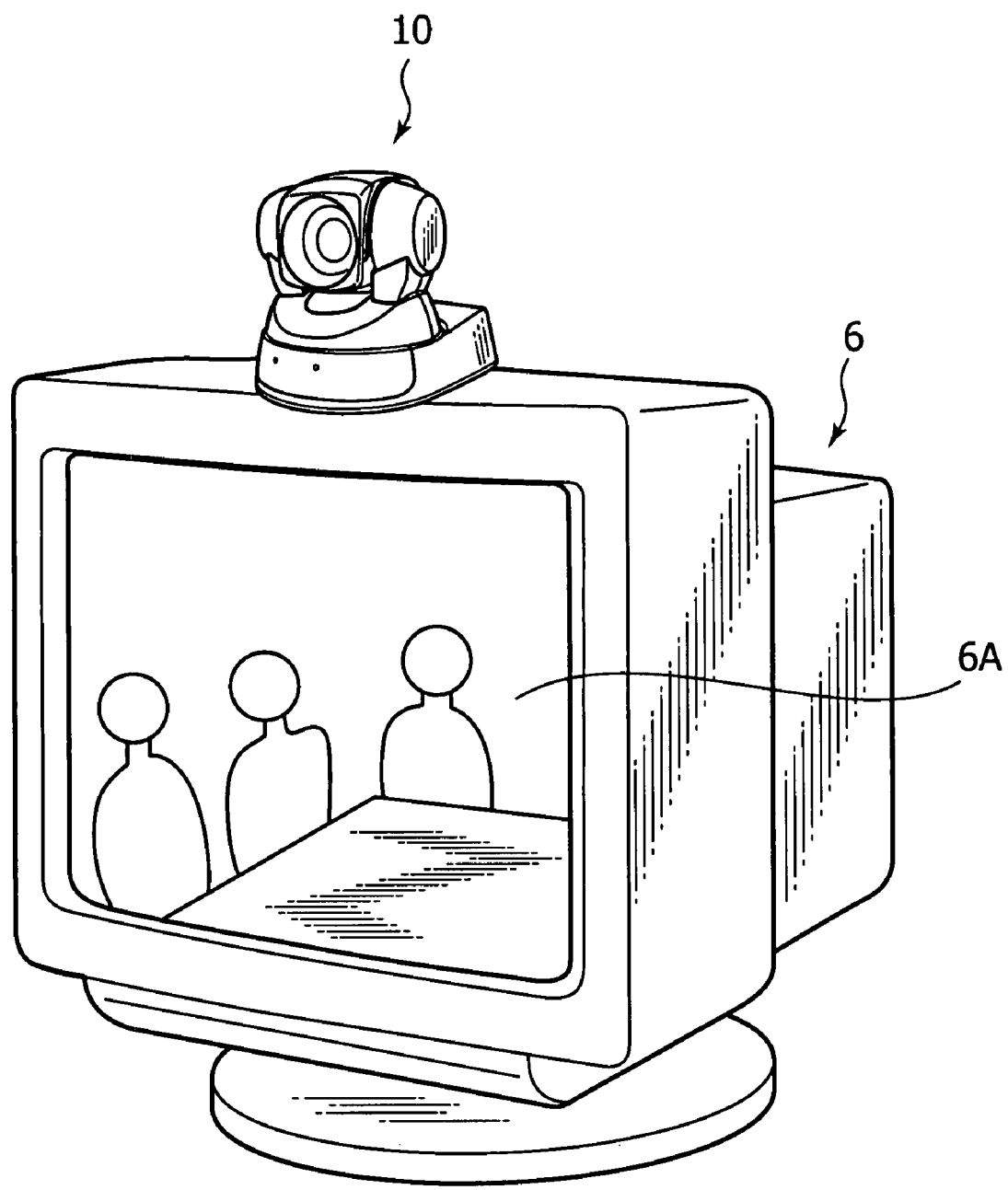
FIG. 3 is an illustrative diagram showing a state where the imaging apparatus 10 is placed on the upper surface of a monitor apparatus 6.

FIG. 1 is a perspective view of an imaging apparatus 10 viewed from front according to an embodiment of the present invention, FIG. 2 is a perspective view of the imaging apparatus 10 viewed from backward according to the embodiment of the present invention, and FIG. 3 is an illustrative diagram showing a state where the imaging apparatus 10 is placed on the upper surface of a monitor apparatus 6.

First, description will be made on the imaging apparatus 10 and a videoconference system using the imaging apparatus 10.

As shown in FIG. 3, the imaging apparatus 10 is a camera used in the videoconference system, and is used by placing it on the upper surface of a monitor apparatus 6 placed in a conference room.

As shown in FIGS. 1 and 2, the imaging apparatus 10 includes a base 12, an outer case 14, an inner casing 16 and a camera unit 18 accommodated in the inner casing 16. The outer case is mounted on the base 12 in a rotatable manner around a first virtual axis L1 passing through the base 12, and the inner casing 16 is mounted in the upper internal side of the outer case 14 in a rotatable manner around a second virtual axis L2 extending on a flat plane crossing with the first virtual axis L1.

The imaging apparatus 10 is used by placing the bottom surface of the base 12 on a mount plane such as an upper surface of a table or monitor apparatus 6. Therefore, the first virtual axis L1 extends along a vertical direction, and the second virtual axis L2 extends along a horizontal direction.

Further, as shown in FIG. 1, photoreceptor sensors 46 which is a part of a receiver unit 40 described later are disposed on the front side of the base 12, facing forwards with certain distance kept between the right and left sensors.

As shown in FIG. 2, disposed on the back side of the base 12 are a video terminal 2402 and an S video terminal 2404 for outputting a video signal, a communication terminal 3802 for making connection to a personal computer 9 (refer to FIG. 4) or the like, and a power input terminal 1002 for inputting a DC power source, or the like.

As shown in FIG. 1, the outer case 14 has a base portion 1402 facing the base 12, and two arm portions 1404 protruding from both opposite sides of the base portion 1402.

The base 12 and base portion 1402 are coupled in a manner capable of being rotated around the first virtual axis L1.

A first drive unit is disposed inside the base 12 for enabling the outer case 14 to rotate around the first virtual axis L1 relative to the base 12, in other words, enable the outer case to rotate in a pan direction. The first drive unit includes a first motor 20 (refer to FIG. 5), a transmission mechanism for transmitting a rotation drive force of the first motor 20 to the outer case 14, or the like. This transmission mechanism may adopt various related-art well-known structures including a gear mechanism or an endless belt and the like.

As shown in FIG. 1, the inner casing 16 is disposed between the upper portion of the two arm portions 1404, and both opposite sides of the inner casing 16 are coupled to the upper portions of the two arm portions 1404 in a manner capable of rotating around the second virtual axis L2.

A second drive unit is disposed inside the inner casing 16, which enable the inner casing 16 to rotate around the second virtual axis L2 relative to the outer case 14, in other words, enable the inner casing to rotate in a tilt direction. The second drive unit includes a second motor 22 (refer to FIG. 5), a transmission mechanism for transmitting a rotation drive force of the second motor 22 to the inner casing 16, and the like. This transmission mechanism may adopt various related-art well-known structures including a gear mechanism or an endless belt and the like.

The camera unit 18 is accommodated in the inner casing 16.

The camera unit 18 is structured in such a manner that an object may be photographed via an inner opening 1602 (refer to FIG. 1) formed to the inner casing 16, and the inner opening 1602 is positioned at the center of the two arm portions 1404.

The camera unit 18 includes an imaging optical system 1802 for guiding an object image and an imaging device 1804 (refer to FIG. 5) for taking an object image guided by the imaging optical system 1802.

The imaging optical system 1802 includes a focusing mechanism and a zooming mechanism, and a objective lens 1802A placed at the most forward position of the imaging optical system 1802 is assembled with the inner opening 1602.

In this embodiment, the outer case 14 is mounted such that it can rotate, for example, in a range of 200 degrees around the first virtual axis L1, and more specifically, in a range of 100 degrees to right and left directions respectively around an optical virtual axis of the camera unit 18 with the front side of the apparatus set as a reference position.

Further, the inner casing 16 is mounted such that it can rotate, for example, in a range of 50 degrees around the second virtual axis L2. More specifically, the inner casing 16 is mounted such that it can rotate in a range of 25 degrees in a direction departing from the base 12 (in an upper direction) from a reference position of an optical virtual axis of the camera unit 18 directing the horizontal direction, and in a range of 25 degrees in a direction approaching the base 12 (in a lower direction), respectively with a state where the base 12 of the imaging device 10 is placed on the horizontal plane.

Therefore, the range of 100 degrees around the first virtual axis L1 and the range of 50 degrees around the second virtual axis L2 may be photographed with the camera unit 18.

Figure 4:
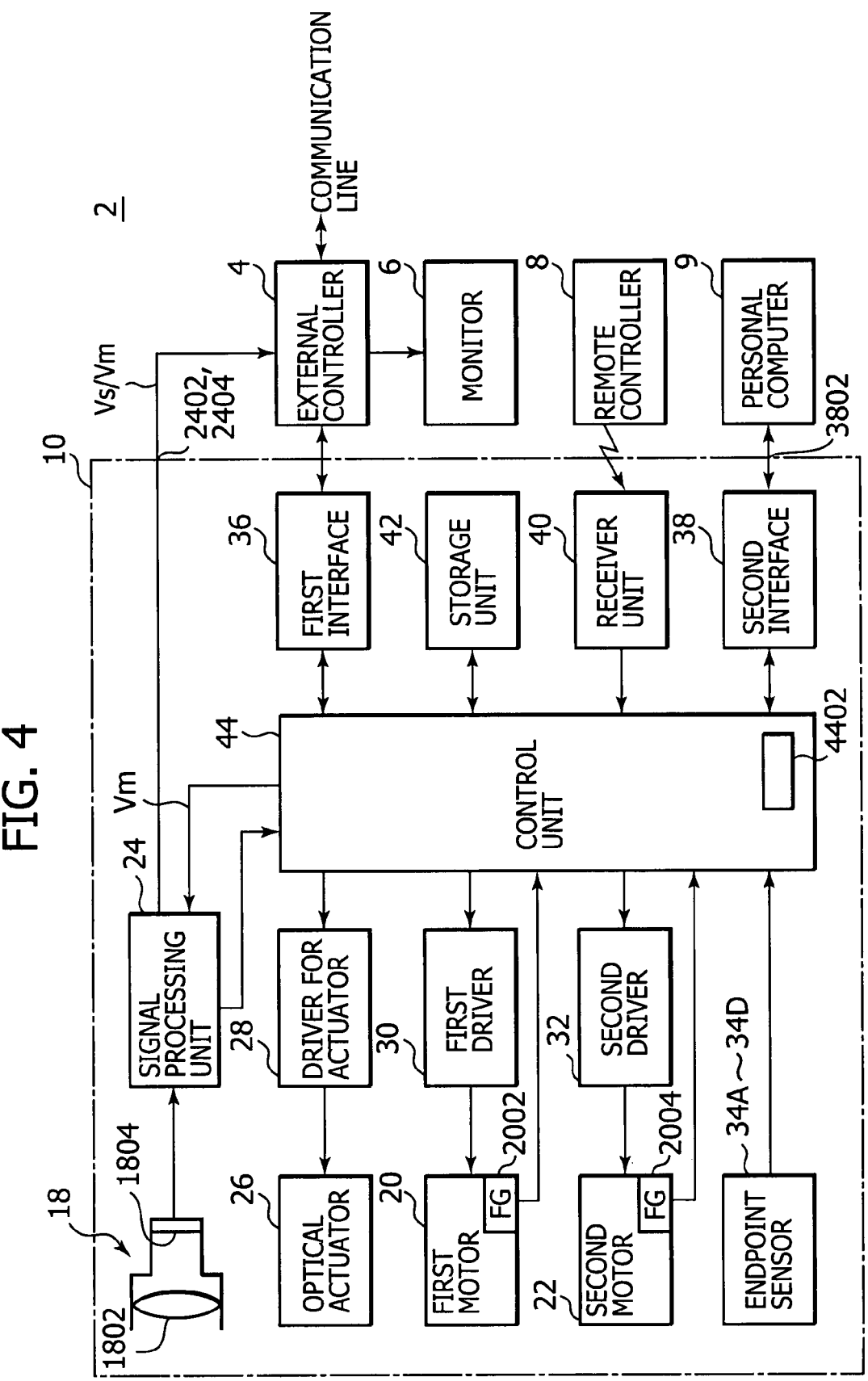
FIG. 4 is a block diagram showing the structure of a control system for a videoconference system 2.

FIG. 4 is a block diagram showing the structure of a control system of the videoconference system 2.

As shown in FIG. 4, the videoconference system 2 includes the imaging apparatus 10, an external controller 4, the monitor apparatus 6, a remote controller 8, a personal computer 9 and the like.

The external controller 4 transfers data including video signal to/from another videoconference system via the imaging apparatus 10 and a communication line, and supplies the monitor apparatus 6 with a video signal supplied from the imaging apparatus 10 and a video signal supplied from another videoconference system.

As shown in FIG. 3, the monitor apparatus 6 displays on a display screen 6A a photographed image supplied from the imaging apparatus 10 via the external controller 4, or a menu screen described later and an image supplied from the other videoconference system, and the like.

The remote controller 8 issues various operation commands to the imaging apparatus 10 by using an infrared signal.

Figure 5:
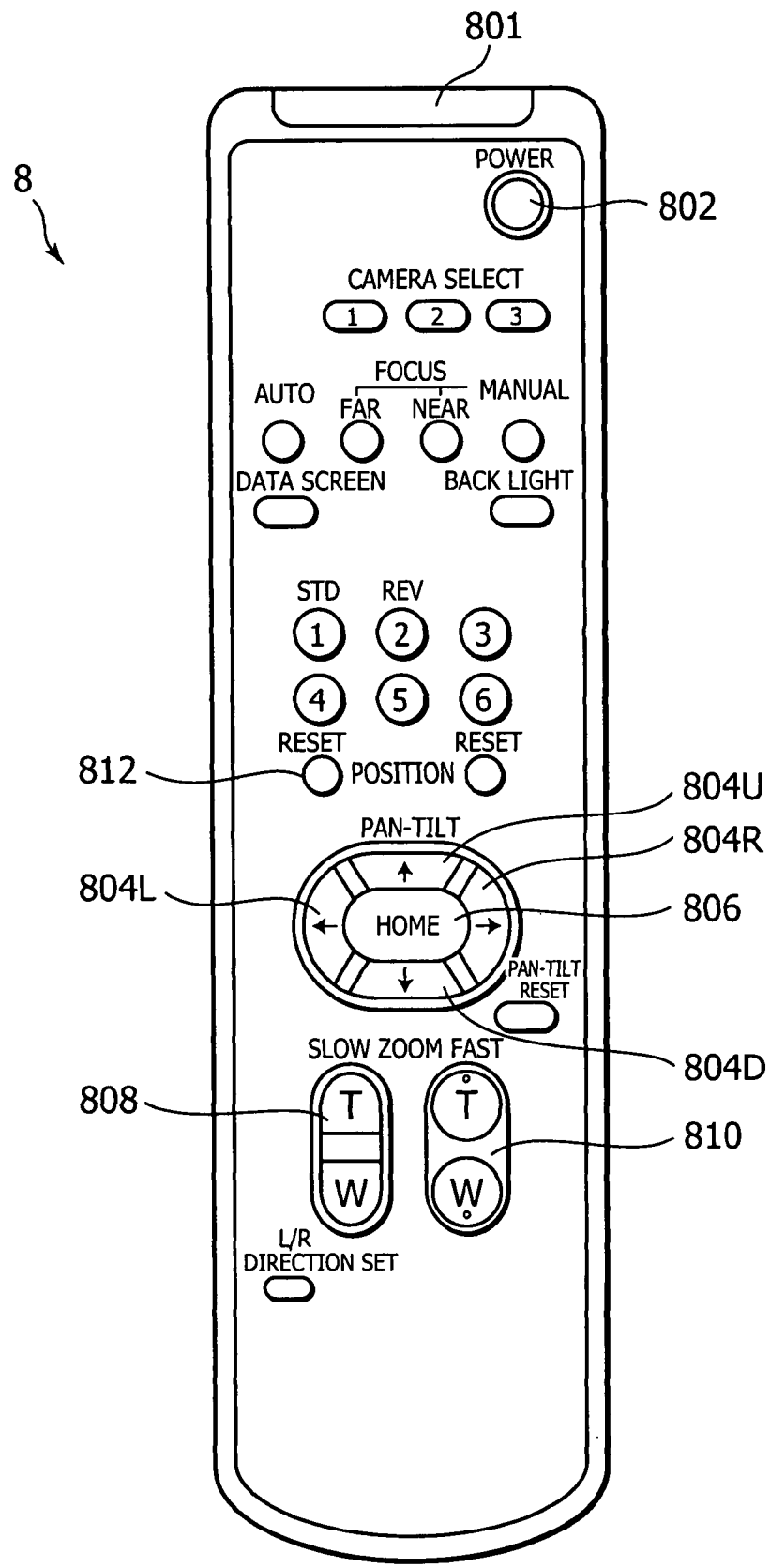
FIG. 5 is a plan view of a remote controller 8 for remotely controlling the imaging apparatus 10.

FIG. 5 is a plan view of the remote controller 8 for remotely controlling the imaging apparatus 10.

As shown in FIG. 5, the remote controller 8 is of an elongated rectangle shape, and has a transmitting unit 801 on an end of the remote controller in the longer direction for transmitting infrared signal. On one side of the thickness direction, various operation keys including a power switch 802 for turning on/off the power source of the imaging apparatus 10, two arrow keys 804L and 804R for right/left directions, two arrow keys 804U and 804D for up/down directions, a decision key (HOME key) 806, a low speed zoom operation key 808, a high speed zoom operation key 810 and a preset button 812. It is noted that the two arrow keys 804L and 804R for right/left directions and two arrow keys 804U and 804D for up/down directions are used for indicating a rotation direction of the camera unit 18 as well as for moving a cursor on the menu screen, for turning a page on the menu screen. The decision key (HOME key) 806 is used when a value set on the menu screen is final.

As shown in FIG. 4, the personal computer 9 is connected to the imaging apparatus 10 by enabling bidirectional communications to supply the imaging apparatus 10 with various control commands (operation commands).

Next, the imaging apparatus 10 will be described in detail with reference to FIG. 4.

In addition to the above-described camera unit 18, first motor 20 and second motor 22, the imaging apparatus 10 includes a signal processing unit 24, an optical actuator 26, a drive for actuator 28, a first driver 30, a second driver 32, endpoint sensors 34A to 34D, a first interface 36, a second interface 38, a receiver unit 40, a storage unit 42, a control unit 44 and the like.

The signal processing unit 24 has a function of performing predetermined signal processing for an image signal supplied from the imaging device 1804 to generate video signals corresponding to various related-art well-known formats. Switching of formats is made based upon a command from the control unit 44.

The video signal outputted from the signal processing unit 24 is supplied to the external controller 4 connected to either one of the video terminals 2402 or 2404. The video signal supplied to the external controller 4 is supplied to the monitor apparatus 6 and also to another videoconference system via the communication line. It is noted that the communication line may adopt various related-art well-known types such as ISDN, ADSL or a private line.

Further, a video signal Vm for displaying the menu screen supplied from the control unit 44 is supplied also to the signal processing unit 24. Similar to the video signal Vs (video signal Vs for displaying an image screen) generated and image captured at the imaging unit 1804, this video signal Vm of the menu screen is also supplied to the monitor apparatus 6 via the external controller 4.

In this embodiment, the signal processing unit 24 has a function of synthesizing the video signal Vs for an image screen and the video signal Vm of a menu screen. The synthesized video signal is supplied to the monitor apparatus 6 to display the image screen and menu screen at the same time.

The optical actuator 26 performs a focusing operation or a variable magnification operation by moving optical components, such as a focus lens or zoom lens, and the like mounted to the imaging optical system 1802, to the optical axis direction.

The actuator driver 28 drives the optical actuator 26 under control of the control unit 44.

The first driver 30 supplies a drive signal generated under control of the control unit 44 to the first motor 20 to drive it.

The second driver 32 supplies a drive signal generated under control of the control unit 44 to the second motor 22 to drive it.

The endpoint sensors 34A and 34B detect the maximum rotatable angles (in this embodiment, a left maximum angle is −100 degrees and a right maximum angle is +100 degrees), respectively, in both rotation directions (left and right directions) of the outer case 14 (camera unit 18). When the endpoint sensors 34A and 34B detect that the outer case 14 reaches the left maximum angle or right maximum angle, the control unit 44 controls the first driver 30 to prevent a further left or right rotation.

The endpoint sensors 34C and 34D detect the maximum rotatable angles (in this embodiment, an up maximum angle is +25 degrees and a down maximum angle is −25 degrees), respectively, in both rotation directions (up and down directions) of the inner casing 16 (camera unit 18). When the endpoint sensors 34C and 34D detect that the inner casing 16 reaches the up maximum angle or down maximum angle, the control unit 44 controls the second driver 32 to prevent a further up or right rotation).

Further, in this embodiment, the first and second motors 20 and 22 use a DC motor having a high response speed, and the first and second motors 20 and 22 are provided with FG sensors 2002 and 2202 for detecting rotation quantities, respectively.

In accordance with detection signals (pulse signals) of the each FG sensors 2002 and 2202, the control unit 44 detects the rotation quantities of the first and second motors 20 and 22, i.e., the rotation angles of the outer case 12 and inner casing 16, and controls the rotations of the outer case 12 and inner casing 16.

In this embodiment, in the initial operation when the power source of the imaging apparatus 10 is turned on, the control unit 44 rotates the first motor 20 to set a reference position (original position) of a rotation angle using one or both of detection results by the endpoint sensors 34A and 34B, and also rotates the second motor 22 to set a reference position (original position) of a rotation angle using one or both of detection results by the endpoint sensors 34C and 34D. It is noted that the first and second motors 20 and 22 are not limited to DC motors, but may adopt motors of various related-art well-known types, and the motor control method may be selectively used properly in accordance with the adopted motor.

The first interface 36 transfers a control command bidirectionally between the control unit 44 and external controller 4.

The second interface 38 is connected to the personal computer 9 with the communication terminal 3802 in between to communicate bidirectionally with the personal computer 9.

The receiver unit 40 will be described later.

The storage unit 42 is an electrically erasable nonvolatile memory such as an EE-PROM. The storage unit 42 stores various setting data of the imaging apparatus 10, and remains to store the setting data even if the power source of the imaging apparatus 10 is turned off.

The control unit 44 includes a CPU, a ROM for storing a control program, a RAM 4402 constituting a working area, interfaces for transferring data or commands to/from each of these components, and the like.

As the control program is executed by CPU, controlled are the signal processing unit 24, actuator driver 28, first driver 30, second driver 32, endpoint sensors 34A to 34D, first interface 36, second interface 38, receiver unit 40 and storage unit 42.

Next, detailed description will be made on the receiver unit 40 which is an embodiment of the present invention.

Figure 6:
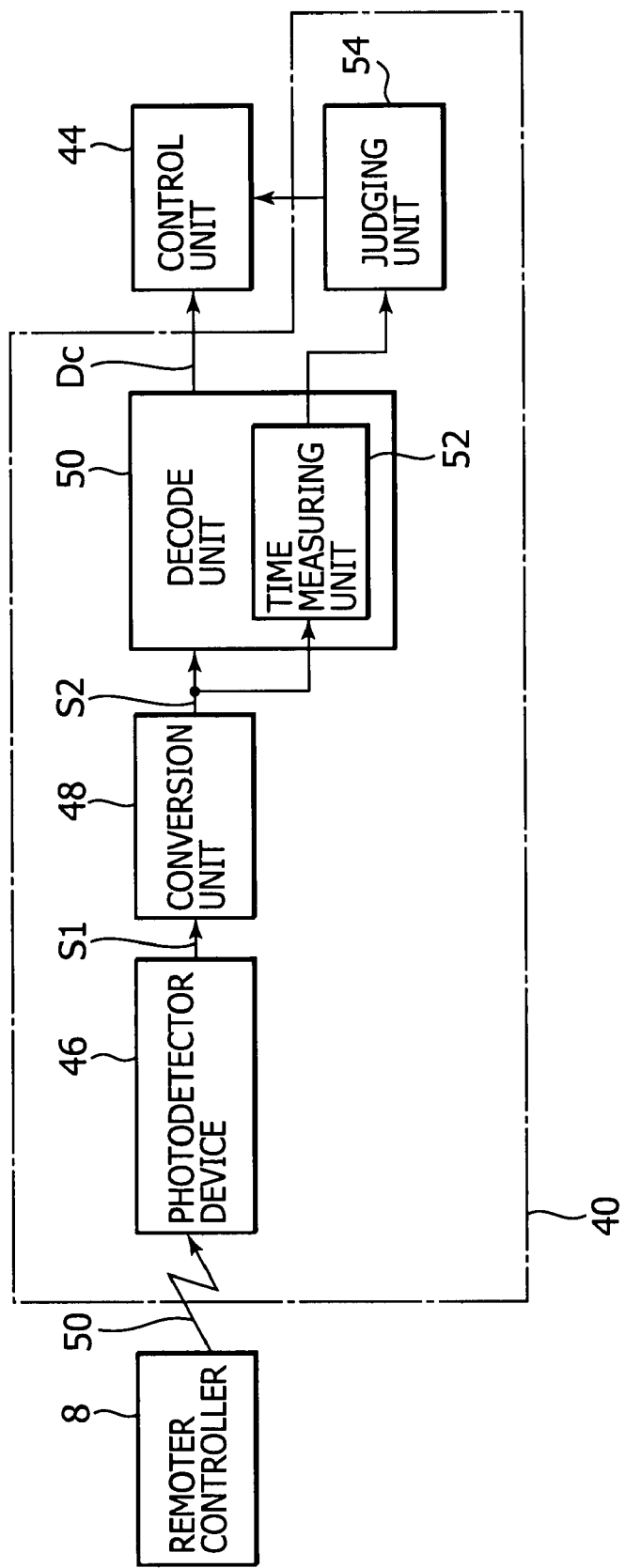
FIG. 6 is a block diagram showing the structure of a receiver unit 40.

FIG. 6 is a block diagram showing the structure of the receiver unit 40.

As shown in FIG. 6, the receiver unit 40 includes a photodetector device 46, a conversion unit 48, a decode unit 50, a time measuring unit 52, a judging unit 54 and the like. The photodetector device 46 receives an infrared signal S0 transmitted from the remote controller 8, and outputs a received signal S1. In this embodiment, the infrared signal S0 transmitted from the remote controller 8 is generated, for example, by modulating a carrier having a predetermined frequency. It is noted that the modulation method, communication protocol or data structure of the infrared signal S0 may adopt various well-known related-art schemes such as a format of the Association of Electric Home Appliances or a format specific to each maker.

The conversion unit 48 converts the received signal S1 outputted from the photodetector device 46 into a pulse signal S2 binarized in an "H" level and an "L" level, to outputs it. Therefore, in the case of active low, the pulse signal S2 is in an ON-state (there is a signal) during the period "L", whereas the pulse signal S2 is in an OFF-state (there is no signal) during the period "H". Further, in the case of active high, the pulse signal S2 is in an ON-state (there is a signal) during the period "H", whereas the pulse signal S2 is in an OFF-state (there is no signal) during the period "L".

The decode unit 50 converts the pulse signal S2 outputted from the conversion unit 48 into code data Dc (control command) and outputs it. It is noted that the control unit 44 perform the above-described various control operations based on the code data Dc.

The time measuring unit 52 is provided in the decode unit 50.

The time measuring unit 52 measures a pulse width of the pulse signal S2 outputted from the conversion unit 48 in accordance with a measuring clock signal having a predetermined period T0.

Figure 7A:
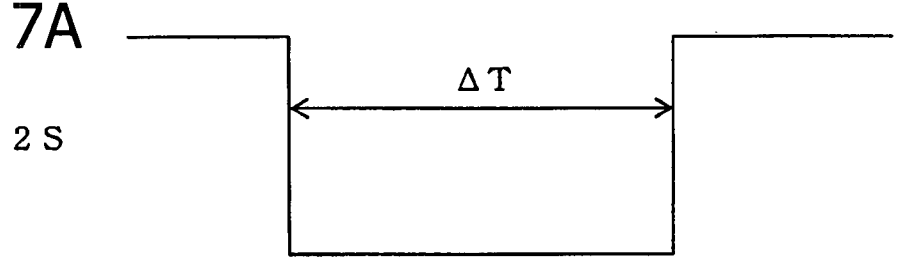
FIG. 7(A) is a waveform diagram of a normal pulse signal S2.
Figure 7B:
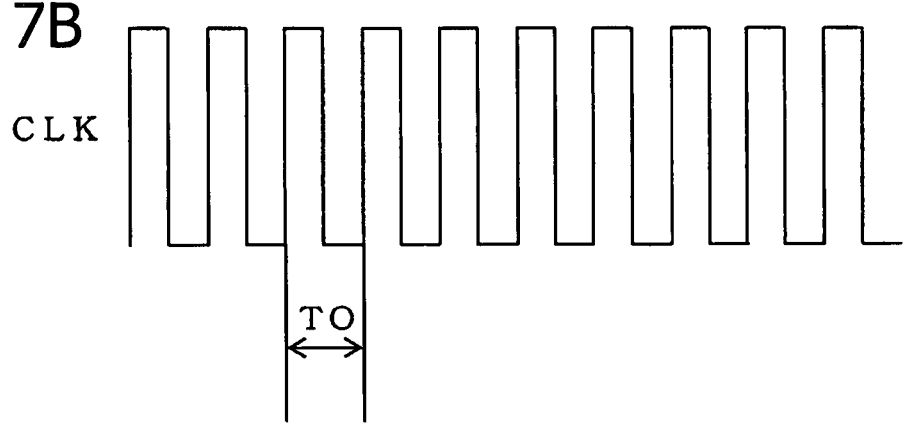
FIG. 7(B) is a waveform diagram of a pulse signal S2 whose waveform is partially eliminated.

As shown in FIGS. 7(A) and 7(B), if the pulse signal S2 is active low, the time measuring unit 52 measures a pulse width ΔT of a period when the pulse signal S2 is at the "L" level (signal-ON period), based on the measuring clock signal CLK having the predetermined period T0. Specifically, it is measured how many cycles of the clock signal CLK corresponds to the pulse width ΔT. It is noted that if the pulse signal S2 is active high, a pulse width in a period when the pulse signal S2 is at the "H" level (signal-ON period) is measured.

The predetermined period T0 of the measuring clock signal CLK is set sufficiently shorter than the pulse width of the pulse signal S2. In this embodiment, for example, the predetermined period T0 is set to 150 μsec, and the pulse width ΔT of the pulse signal S2 is for example, set to 1800 μsec which is a twelvefold of the predetermined period T0.

The decode unit 50 decodes the pulse signal S2 in accordance with the pulse width of the pulse signal S2 measured by the time measuring unit 52.

Further, in this embodiment, the time measuring unit 52 constitutes a measuring unit for measuring a pulse width of a pulse signal appearing at the output terminal of the conversion unit 48 in a state where the infrared signal S0 from the remote controller 8 is not received at the photodetector device 46.

Namely, in a state where the infrared signal S0 from the remote controller 8 is not received at the photodetector device 46, if an infrared ray contained in illumination light of an inverter illumination apparatus is received at the photodetector device 46, a pulse signal is generated at the output terminal of the conversion unit 48, in response to the infrared ray. The time measuring unit 52 measures the pulse width, which is a period where the pulse signal is in a signal-ON state.

The judgment unit 54 judges whether the pulse width measured by the time measuring unit 52 is not shorter than a predetermined time Tn.

This predetermined time is set to a pulse width sufficiently long to disable the decode unit 50 to decode when the pulse signal generated at the output terminal of the conversion unit 48 is inputted to the decode unit 50.

In this embodiment, the predetermined time Tn is set to the predetermined period T0 of the measuring clock signal.

Figure 8A:
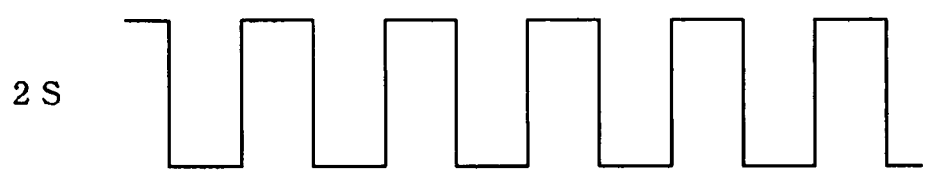
FIG. 8(A) is a waveform diagram of a pulse signal S2.

Decode inability will be described in detail. As shown in FIG. 8(A), in a state where the infrared ray contained in illumination light of an inverter illumination apparatus is not received at the photodetector device 46, when the infrared signal S0 from the remote controller 8 is received at the photodetector device 46, the pulse signal S2 having a normal waveform corresponding to the infrared signal S0 appears at the output terminal of the conversion unit 48.

Therefore, the decode unit 50 correctly decodes the pulse signal S2 having the normal waveform and outputs the code data Dc.

Figure 8B:
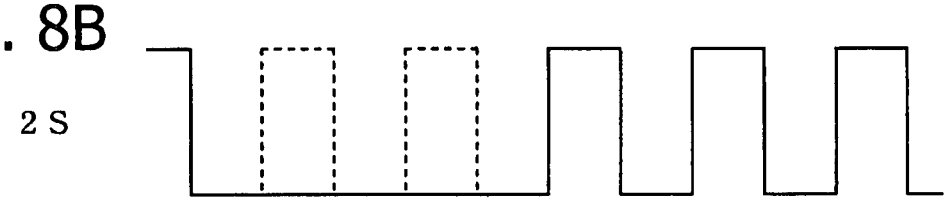
FIG. 8(B) is a waveform diagram of a clock signal CLK for measuring.

On the other hand, as shown in FIG. 8(B), in a state where the infrared ray contained in illumination light of an inverter illumination apparatus is received at the photodetector device 46, when the infrared signal S0 from the remote controller 8 is received at the photodetector device 46, portion of the pulse signal S2 at the output terminal of the conversion unit 48 is lost as indicated by broken lines in FIG. 8, and thus the waveform of the pulse signal S2 is disturbed. This is because the waveform corresponding to the infrared signal S0 is superposed upon the waveform of the pulse signal corresponding to an infrared ray contained in the illumination light.

Consequently, the decode unit 50 cannot perform a decode operation and cannot output the code data Dc, because the waveform of the inputted pulse signal S2 is disturbed.

Figure 9:
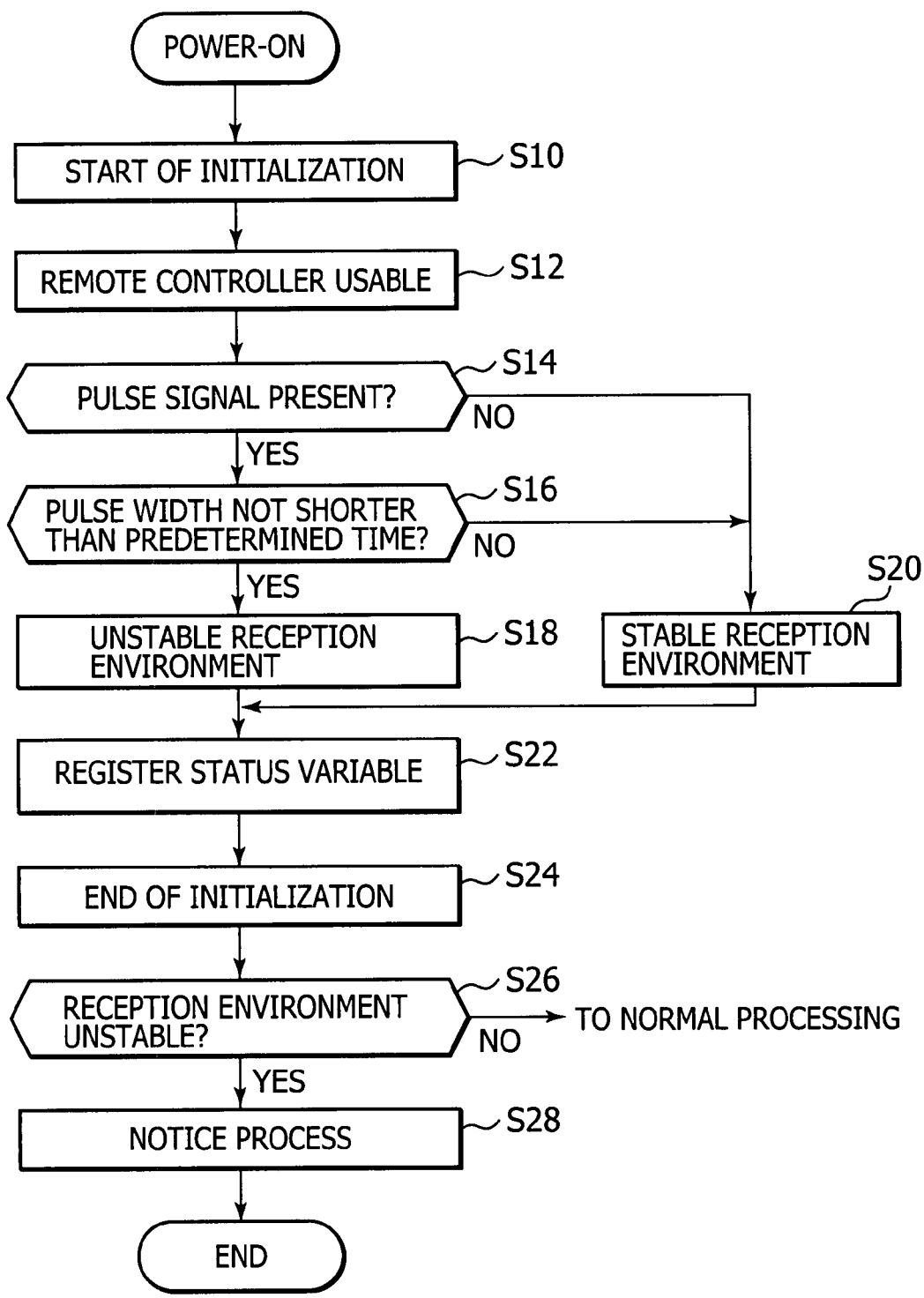
FIG. 9 is a flow chart illustrating the operation of the imaging apparatus 10.

Next, with reference to the flow chart of FIG. 9, description will be made on the operation of the imaging apparatus 10 of the present embodiment.

In this embodiment, each time the power source of the imaging apparatus 10 is turned on, the control unit 44 performs an initialization operation, i.e., clearing various registers or counters of the microcomputer or setting initial values, and at the same time, the following processes are performed.

As the power source is turned on, the initialization operation starts (Step S10).

The operation of the receiver unit 40 becomes active after a lapse of some time (takes a state that an infrared signal transmitted from the remote controller 8 may be received) (Step S12). However, at this stage, the remote controller 8 is not operated.

The time measuring unit 52 monitors the output terminal of the conversion unit 48 to judge whether a pulse signal appears (Step S14).

When the pulse signal appears (if Step S14 is affirmative), the time measuring unit 52 measures a pulse width of the pulse signal, and the judging unit 54 judges whether the pulse width of the pulse signal is not shorter than the predetermined time Tn (=T0) (Step S16).

If not shorter than the predetermined time Tn (if Step S16 is affirmative), the judging unit 54 notifies this effect to the control unit 44, and the control unit 44 judges that the reception environment for receiving an infrared signal is unstable (Step S18).

Then the control unit 44 registers (records in a register) a status variable indicating that the reception environment is unstable, and terminates the initialization process (Steps S22 and S24).

Next, the control unit 44 judges from the status variable whether the reception environment is unstable (Step S26), and if judged as unstable, executes a notifying process (Step S28).

The notice process is performed by displaying on the monitor apparatus 6 an image such as characters, a symbol or an icon indicating that the reception environment is unstable.

On the other hand, if a pulse signal is not detected at Step S14 or if it is judged at Step S16 that the pulse width of the pulse signal is less than the predetermined time Tn (=T0), the time measuring unit 52 notifies this effect to the control unit 44, and thus the control unit 44 judges that the reception environment is stable (Step S20).

Thereafter, the control unit 44 registers (writes in a register) a status variable indicating that the reception environment is stable, to terminate the initialization process (Steps S22 and S24).

Next, the control unit 44 judges from the status variable whether the reception environment is unstable (Step S26), and if judged as stable, the process transits to normal processing.

According to the embodiment, it is judged whether a pulse width of a pulse signal appearing at the output terminal of the conversion unit 48 is not shorter than the predetermined time, in the state that the infrared signal S0 from the remote controller 8 is not received at the photodetector device 46. It is therefore possible to readily and reliably detect whether the reception environment of the infrared signal from the remote controller 8 is unstable because of interference of an infrared ray contained in illumination light from the inverter illumination apparatus or in light irradiated from another electronic apparatus, in other words, whether the environment allows the remote controller to operate stably.

Therefore, if the reception environment is unstable, a user may take measures such as turning off the inverter illumination apparatus, changing the position and posture of the imaging apparatus 10 to prevent illumination light from the inverter illumination apparatus from being received by the optical device, and setting an optical filter to the photodetector device 46. This is effective for smoothly operating the imaging apparatus 10 using the remote controller 8.

It is noted, in this embodiment, whether the reception environment of the infrared signal S0 from the remote controller 8 is unstable or not is detected during the initialization process after the power source is turned on. It is obvious that a similar process may be executed during the normal operation.

Further in this embodiment, the notice process of notifying the effect that the reception environment is unstable is performed by displaying on the monitor apparatus 6 an image such as characters, a symbol or an icon indicating that the reception environment is unstable. Also, the following steps may be adopted.

1) A display lamp for alarm notice may be provided on the imaging apparatus 10 to perform the notice process by turning on or flashing the display lamp.

2) A display unit for alarm notice is provided which can display characters, a symbol or an icon to perform the notice process by display on the display unit.

3) An audio output unit for alarm notice is provided to perform the notice process by an output of voices from the audio output unit. The audio output unit may be a buzzer or a speaker.

Further, a notice signal output unit may be provided which outputs a notice signal for notifying the effect that the reception environment is unstable, or a notifying apparatus for executing the notice process similar to that described above may be provided outside of the imaging apparatus 10.

Furthermore, in this embodiment, a measuring unit for measuring a pulse width of a pulse signal appearing at the output terminal of the conversion unit 48 is the time measuring unit 52 in the decode unit 50 with the state that the infrared signal S0 from the remote controller 8 is not received at the photodetector device 46 is described. It is obvious that the measuring unit may be provided separately in place of the time measuring unit 52 in the decode unit 50. However, the structure of the embodiment is effective for simplifying the circuit structure and reducing cost comparing with a case when the measuring unit is provided separately.

In this embodiment, although the description assumes that the electronic apparatus is the imaging apparatus 10, an embodiment of the present invention is also applicable to various electronic apparatus such as a television system operated by a remote controller using an infrared signal, and or audio system.

Further, it is obvious that the electronic apparatus may be structured as a tester having only a function of notifying whether the reception environment is unstable or not, by providing a display lamp, display unit and audio output unit.

According to an embodiment of the present invention, it is possible to readily and reliably detect whether a reception environment of an infrared signal from a remote controller is unstable or not because of interference of an infrared ray contained in illumination light from an inverter illumination apparatus or the like.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2006-281153 filed in the Japanese Patent Office on Oct. 16, 2006, the entire content of which being incorporated herein by reference.

What is claimed is:

1. An electronic apparatus comprising:
   a photodetector element receiving an infrared signal transmitted from a remote controller and outputting a received signal;
   a conversion unit converting the received signal outputted from the photodetector element into a binary pulse signal and outputting the binary pulse signal;
   a decode unit for converting the pulse signal outputted from the conversion unit into code data and outputting the code data;
   a control unit performing a control operation in accordance with the code data;
   a measuring unit measuring a pulse width of the pulse signal outputted from the conversion unit in a state where the infrared signal from the remote controller is not received at the photodetector element; and
   a judging unit judging whether the pulse width measured by the measuring unit is equal to or longer than a predetermined time, wherein:
      if the judging unit determines that the pulse width is shorter than the predetermined time, the control unit judges a stable reception environment, and
      if the judging unit determines that the pulse width is longer than the predetermined time, the control unit judges an unstable reception environment.

2. The electronic apparatus according to claim 1, wherein:
   the decode unit includes a time measuring unit for measuring the pulse width of the pulse signal outputted from the conversion unit in accordance with a measuring clock signal having a predetermined period;
   the decode unit for decoding the pulse signal in accordance with the pulse width measured by the time measuring unit; and
   the measuring unit including the time measuring unit.

3. The electronic apparatus according to claim 1, wherein:
   the decode unit includes a time measuring unit for measuring the pulse width of the pulse signal outputted from the conversion unit in accordance with a measuring clock signal having a predetermined period;
   the decode unit for decoding the pulse signal in accordance with the pulse width measured by the time measuring unit;
   the measuring unit including the time measuring unit; and
   the predetermined time used for judgment by the judging unit is the predetermined period.

4. An electronic apparatus comprising:
   a photodetector element receiving an infrared signal transmitted from a remote controller and outputting a received signal;
   a conversion unit converting the received signal outputted from the photodetector element into a binary pulse signal and outputting the binary pulse signal;
   a decode unit for converting the pulse signal outputted from the conversion unit into code data and outputting the code data;
   a control unit performing a control operation in accordance with the code data;
   a measuring unit measuring a pulse width of the pulse signal outputted from the conversion unit in a state where the infrared signal from the remote controller is not received at the photodetector element; and
   a judging unit judging whether the pulse width measured by the measuring unit is equal to or longer than a predetermined time, wherein:
      the control unit executes a notifying process of notifying an effect that an abnormal state is detected, if it is judged by the judging unit that the pulse width is equal to or longer than the predetermined time.

5. An electronic apparatus comprising:
a photodetector element receiving an infrared signal transmitted from a remote controller and outputting a received signal;
a conversion unit converting the received signal outputted from the photodetector element into a binary pulse signal and outputting the binary pulse signal;
a decode unit for converting the pulse signal outputted from the conversion unit into code data and outputting the code data;
a control unit performing a control operation in accordance with the code data;
a measuring unit measuring a pulse width of the pulse signal outputted from the conversion unit in a state where the infrared signal from the remote controller is not received at the photodetector element;
a judging unit judging whether the pulse width measured by the measuring unit is equal to or longer than a predetermined time; and
a display lamp for alarm notice, wherein:
the control unit executes a notifying process of notifying an effect that an abnormal state is detected, if it is judged by the judging unit that the pulse width is equal to or longer than the predetermined time; and
the notice process by the control unit is performed by turning on or flushing of the display lamp.

6. An electronic apparatus comprising:
a photodetector element receiving an infrared signal transmitted from a remote controller and outputting a received signal;
a conversion unit converting the received signal outputted from the photodetector element into a binary pulse signal and outputting the binary pulse signal;
a decode unit for converting the pulse signal outputted from the conversion unit into code data and outputting the code data;
a control unit performing a control operation in accordance with the code data;
a measuring unit measuring a pulse width of the pulse signal outputted from the conversion unit in a state where the infrared signal from the remote controller is not received at the photodetector element;
a judging unit judging whether the pulse width measured by the measuring unit is equal to or longer than a predetermined time; and
a display unit for alarm notice, wherein:
the control unit executes a notifying process of notifying an effect that an abnormal state is detected, if it is judged by the judging unit that the pulse width is equal to or longer than the predetermined time; and
the notice process by the control unit is performed by display on the display unit.

7. An electronic apparatus comprising:
a photodetector element receiving an infrared signal transmitted from a remote controller and outputting a received signal;
a conversion unit converting the received signal outputted from the photodetector element into a binary pulse signal and outputting the binary pulse signal;
a decode unit for converting the pulse signal outputted from the conversion unit into code data and outputting the code data;
a control unit performing a control operation in accordance with the code data;
a measuring unit measuring a pulse width of the pulse signal outputted from the conversion unit in a state where the infrared signal from the remote controller is not received at the photodetector element;
a judging unit judging whether the pulse width measured by the measuring unit is equal to or longer than a predetermined time; and
an audio output unit for alarm notice, wherein:
the control unit executes a notifying process of notifying an effect that an abnormal state is detected, if it is judged by the judging unit that the pulse width is equal to or longer than the predetermined time; and
the notice process by the control unit is performed by output of audio sounds by the audio output unit.

8. An electronic apparatus comprising:
a photodetector element receiving an infrared signal transmitted from a remote controller and outputting a received signal;
a conversion unit converting the received signal outputted from the photodetector element into a binary pulse signal and outputting the binary pulse signal;
a decode unit for converting the pulse signal outputted from the conversion unit into code data and outputting the code data;
a control unit performing a control operation in accordance with the code data;
a measuring unit measuring a pulse width of the pulse signal outputted from the conversion unit in a state where the infrared signal from the remote controller is not received at the photodetector element;
a judging unit judging whether the pulse width measured by the measuring unit is equal to or longer than a predetermined time; and
a notice signal output unit for outputting a notice signal of notifying an effect that an abnormal state is detected, if the judging unit judges that the pulse width is equal to or longer than the predetermined time.

9. The electronic apparatus according to claim 1, wherein:
the electronic apparatus is an imaging apparatus; and
the electronic apparatus comprises:
an imaging optical system for guiding an object image;
an imaging device for taking the object image and generating an image signal; and
a signal processing unit for generating, from the generated image signal, a video signal having a predetermined format.

* * * * *